May 6, 1930.  L. E. LA BRIE  1,756,983
BRAKE
Filed Feb. 14, 1927   2 Sheets-Sheet 1
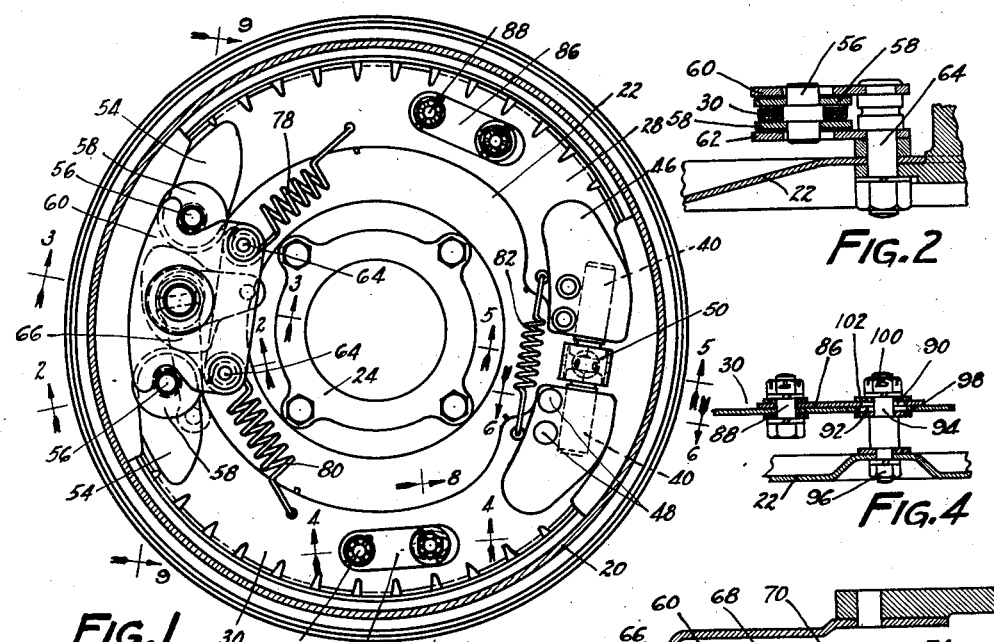
FIG.1
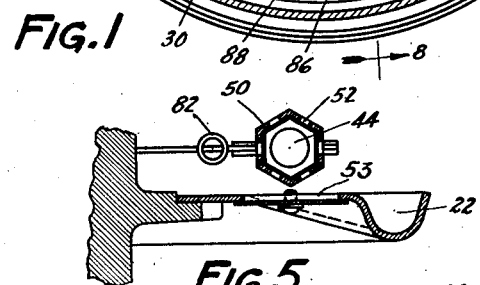
FIG.5
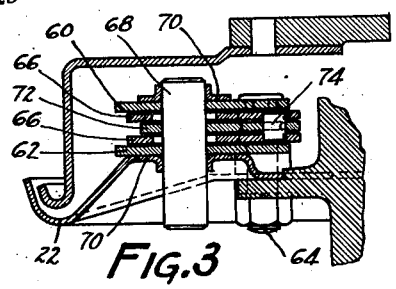
FIG.2
FIG.4
FIG.3
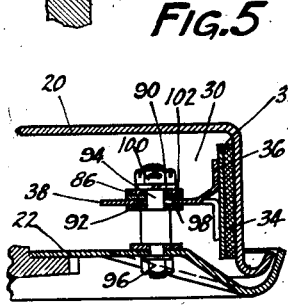
FIG.8
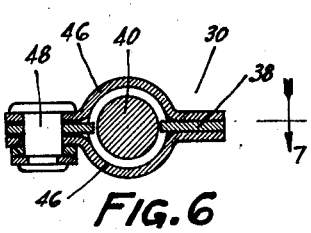
FIG.6
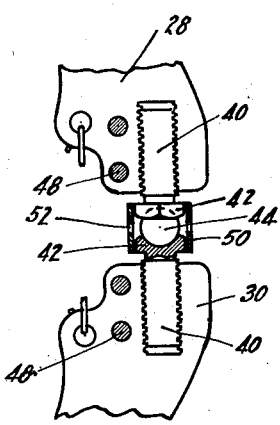
FIG.7
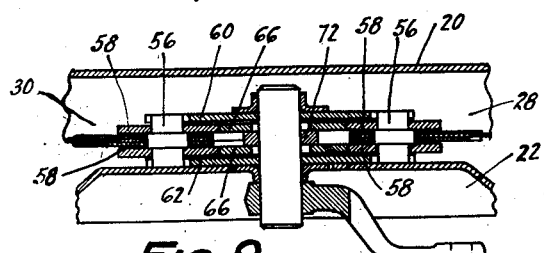
FIG.9
INVENTOR
LUDGER E. LaBRIE
BY
ATTORNEY

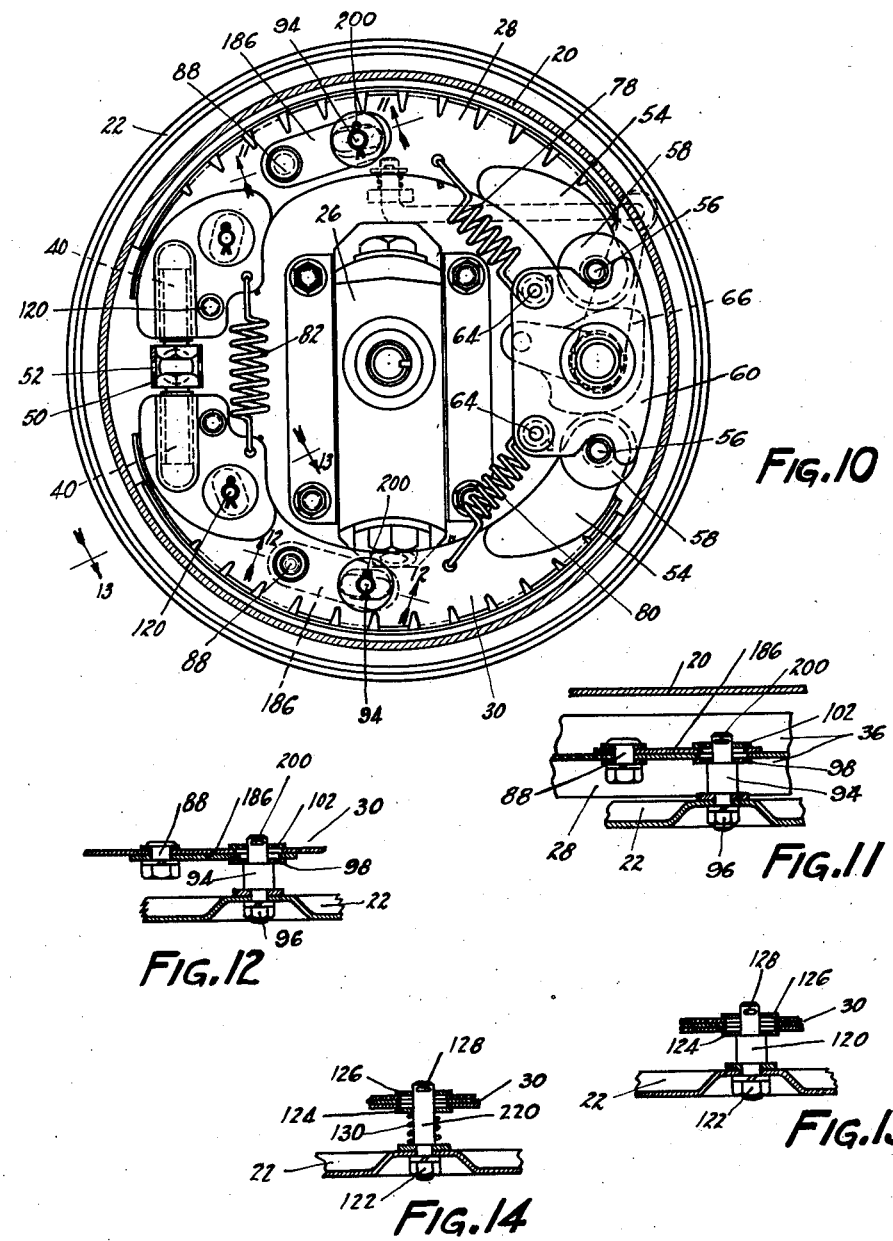

Patented May 6, 1930

1,756,983

UNITED STATES PATENT OFFICE

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS

BRAKE

Application filed February 14, 1927. Serial No. 168,045.

This invention relates to brakes, and is illustrated as embodied, in two embodiments, in internal expanding automobile brakes of the type having a pair of shoes so arranged that the first applies the second when the drum is turning in one direction and the second applies the first when the drum is turning in the other direction. An important object of the invention is to provide simple and reliable means for positioning the shoes or their equivalents, when the brake is released, in such a manner that there are equal clearances between the shoes and the opposite sides of the drum. Preferably there are a pair of novel stop devices arranged on opposite sides of the drum and which cooperate with one or more springs to determine the positions of the shoes when the brake is released. In the illustrated embodiments, these devices are so formed as to position the shoes without shifting when the brake is new, that is, before it begins to wear, and after the brake begins to wear they are shifted slightly each time the brake is applied and are returned to their original positions each time by the above-described return springs. This insures that any incorrect positioning of the shoes will automatically be corrected the next time the brake is applied and released.

Other features of novelty relate to the particular construction of the shiftable stops, to a novel connection between the shoes, to an improved arrangement of steady rests for the shoes, and to other novel and desirable details of construction which will be apparent from the following description of the illustrative embodiments shown in the accompanying drawings, in which:

Figure 1 is a vertical section through one embodiment of the invention, just inside the head of the brake drum, and showing the brake shoes in side elevation;

Figure 2 is a partial radial section on the line 2—2 of Figure 1, showing one of the anchors for the brake;

Figure 3 is a partial radial section on the line 3—3 of Figure 1, showing the brake-applying means;

Figure 4 is a partial section lengthwise of one shoe, on the line 4—4 of Figure 1, showing the novel frictionally-clamped positioning device;

Figure 5 is a partial radial section on the line 5—5 of Figure 1, showing the means for adjusting the brake;

Figure 6 is a partial section on the line 6—6 of Figure 1 through one of the brake shoes showing part of the adjusting means;

Figure 7 is a partial section on the line 7—7 of Figure 6,—that is, it is a view corresponding to part of Figure 1 but with one of the separate plates at the end of each of the shoes removed;

Figure 8 is a partial radial section on the line 8—8 of Figure 1, showing the novel shoe-positioning means;

Figure 9 is a partial section on the line 9—9 of Figure 1, showing part of the brake-applying means;

Figure 10 is a view corresponding to Figure 1 but showing a somewhat different brake mounted to act on a front wheel;

Figure 11 is a partial section lengthwise of one shoe on the line 11—11 of Figure 10;

Figure 12 is a partial section lengthwise of the other shoe on the line 12—12 of Figure 10;

Figure 13 is a partial radial section on the line 13—13 of Figure 10, showing one of the novel steady rests; and Figure 14 is a view corresponding to Figure 13 but showing a different form of steady rest.

Each of the brakes includes a rotatable drum 20, at the open side of which is arranged a suitable stationary support such as a backing plate 22, which in the arrangement of Figure 1 is bolted to a flange 24 on the rear axle, while in the arrangement of Figure 10 it is bolted to the front wheel spindle or knuckle 26. Within the drum is arranged the retarding means of the brake, which in these particular brakes includes a pair of floating interchangeable brake shoes 28 and 30. Each of the shoes is shown as built up, as best appears in Figure 8, with an outer band 32 carrying a brake lining 34, to which are welded or riveted or otherwise secured tongues 36 bent laterally in opposite directions from a stamping 38 forming the stiffening web of the shoe.

At one side of the drum the shoes are arranged to be connected together so that when the drum is turning in one direction the shoe 28 will apply the shoe 30, while when the drum is turning in the other direction the shoes will shift to corresponnd so that the shoe 30 will apply the shoe 28. The particular connection shown, and which is in some respects novel, includes a pair of connecting devices 40 formed with approximately square threads meshing with teeth stamped in the webs of the shoes 28 and 30 and formed with non-circular heads 42 having partially spherical sockets or depressions facing toward each other and receiving a spherical thrust member 44. The stems of the members 40 are held in place by patches or plates 46 on opposite sides of the webs 38 of the shoes which are spot-welded to the webs along their outer edges. The plates 46 are held in position to grip frictionally the members 40 by fixed-tension devices such as rivets 48. The non-circular heads 42 are embraced by a sleeve 50 of corresponding shape, formed with openings 52 for a tool which may be inserted therein through an opening 53 in the backing plate to turn the sleeve to cause the members 40 to be adjusted toward each other.

At the opposite ends of the shoes, plates or patches 54 are spot-welded or otherwise secured to opposite sides of the shoes to provide sufficient bearing for pivots 56 carrying thrust rollers 58. Pivots 56 project past the rollers 58 on opposite sides of the shoe to form anchoring projections adapted to seat in notches formed on the opposite edges of anchor plates 60 and 62 fixedly mounted on posts 64. When the drum in Figure 1 is turning clockwise the shoe 28 forces the shoe 30 in such a direction that the torque of both shoes is taken on the pin 56 of the shoe 30; while on the other hand when the drum is turning counter-clockwise the torque of both shoes is taken by the pin 56 of shoe 28.

The brake is arranged to be applied by a pair of cams 66 which are in the form of flat stampings having relatively large openings to provide ample clearance for an operating shaft 68 journalled in bearings provided by stampings 70 secured to the plates 60 and 62. An arm or lever 72 is fixed on the shaft 68 between the two cams 66 and is connected at its end by a floating pivot 74 to two integral extensions extending in a general way toward the center of the drum from the cams 66.

The shoes are urged away from the drum by means shown as including a spring 78 connected at one end to the shoe 28 and at the other end to the nearest post 64, and a spring 80 connected at one end to the shoe 30 and at the other end to the nearest post 64, and a relatively strong spring 82 connecting the shoes on the opposite side of the drum from the cam and urging the two adjustable members 40 into engagement with opposite sides of the spherical thrust member 44.

An important feature of the present invention relates to novel means for positioning the shoes 28 and 30 when the brake is released. The positioning devices used in the embodiment of Figures 1–9 include plates or the like 86 on the sides of the stiffening webs of the shoes next the head of the drum, and which are frictionally clamped to the stiffening webs at the ends nearest the cams 66 by means such as bolts 88, the positioning devices extending in a general way lengthwise of the shoes. At the opposite end each of the devices 86 is formed with an opening or slot 90 registering with a somewhat larger opening 92 in the shoe itself and through which two openings passes a reduced portion of a steady rest or positioning pin 94 secured by a nut 96 to the backing plate 22. The steady rest 94 is shouldered for a washer 98 engaging the face of the stiffening web of the shoe next the backing plate and has at its end means such as a castellated nut 100 holding another washer 102 engaging the opposite face of the positioning device 86. The washers 98 and 102 hold the shoe laterally but offer practically no resistance to angular movement of the shoe.

The slot 90 in the postioning device 86 is a small fraction of an inch wider than the diameter of the reduced portion of the steady rest 94 which passes through the slot. When the brake is new, that is, before the brake lining 34 has worn to any extent, the members 40 are supposed to be adjusted so that when the brake is released, with the pins 56 in engagement with the anchoring plates 60 and 62 and with the adjusting devices 40 held by the spring 82 in engagement with the spherical thrust member 44, the steady rests 94 will just engage the sides of the slots 90 nearest the brake drum. When the brake is now applied, the movement of the shoes is supposed to be just sufficient so that when the linings 34 are compressed against the drum each steady rest 94 will just engage the inner edge of its slot 90 without actually shifting the positioning device 86 against frictional resistance of the bolt 88. As the brake wears, however, the shoes gradually are moved further outward in applying the brake, so that each time the brake is applied the positioning devices 86 are shifted slightly by the steady rests 94. When the brake is released after such shifting of the positioning devices 86, the springs 78, 80, and 82 first pull the shoes away from the drum until the outer edges of the slots 90 engage the steady rests 94, and are preferably sufficiently strong so that they then continue to move the shoes away from the drum and thus shift the positioning devices 86 back to their original postions, thus insuring that the two shoes will have equal clearances with respect to the drum. If, for any reason, the clearances are unequal at any time, this will automatically be corrected the next time the brake is applied and released. Obviously, the members 40 may be adjusted by a tool inserted in the openings 52 to spread the shoes apart, to give them their original clearances with respect to the brake drum after the lining has worn, whereupon the positioning devices 86 will again function as they did when the brake was new.

The arrangement in Figures 10, 11, and 12 differs from that just described particularly in that, in order to make the shoes 28 and 30 completely interchangeable, the positioning devices 186 are on opposite sides of the shoes, as they appear when the brake is assembled as in Figure 10. Otherwise, the positioning devices are constructed and operated substantially as described above, although if preferred the nuts 100 may be replaced by cotter pins 200.

In the arrangement of Figures 10 to 13, I have also shown the connected ends of the shoes positioned laterally, by novel steady rests 120, best shown in Figure 13. As appears in this figure, the steady rests are secured to the backing plate 22 by nuts 122 or equivalent fastenings and each is shouldered to receive a washer 124 engaging one face of the shoe and cooperating with a washer 126 which engages the opposite face and which is held in place by a cotter pin 128. In the arrangement of Figure 14, the washer 124, instead of resting against the shoulder on steady rest 220, is held in place by a coil spring 130.

While two illustrative embodiments of the invention have been described in detail, it is not my intention to limit its scope to those particular embodiments, or otherwise than by the terms of the appended claims.

I claim:

1. A brake comprising, in combination, a drum, retarding means engageable with the drum and including shoes connected by an adjustable pivot connection, spring means urging the retarding means away from the drum, frictionally clamped movable positioning means cooperating with the spring means and shifted, at least after the brake has begun to wear, each time the brake is operated to position said shoes with equal clearances with respect to the drum on opposite sides of the drum, and means for resisting shifting of the positioning means and holding the positioning means wherever it is shifted when the brake is released.

2. A brake comprising, in combination, a drum, retarding means engageable with the drum, spring means urging the retarding means away from the drum, and frictionally clamped movable positioning means cooperating with the spring means and shifted, at least after the brake has begun to wear, each time the brake is released to position the retarding means with equal clearances with respect to the drum on opposite sides of the drum.

3. A brake comprising, in combination, a drum, retarding means engageable with the drum, spring means urging the retarding means away from the drum, and a frictionally-clamped positioning stop on each side of the drum automatically set when the brake is released to equalize the clearance of the retarding means on said sides of the drum.

4. A brake comprising, in combination, a drum, a pair of pivotally-connected friction devices engageable with the drum, and a frictionally-clamped positioning device for each friction device.

5. A brake comprising, in combination, a drum, shoes engageable with the drum, frictionally-clamped stops and springs cooperating to position the shoes equal distances from the drum when the brake is released, and wear-adjusting means separate from said stops.

6. A brake comprising, in combination, a drum, a pair of shoes engageable with the drum and the first of which applies the second when the drum is turning in one direction and the second of which applies the first when the drum is turning in the other direction, a stop cooperating with each shoe and allowing its shoe a predetermined brake-applying movement and thereafter being shifted by the shoe, and spring means for moving the shoes away from the drum and for shifting the stops back to their original positions when the brake is released.

7. A brake comprising, in combination, a drum, a pair of shoes engageable with the drum and the first of which applies the second when the drum is turning in one direction and the second of which applies the first when the drum is turning in the other direction, a stop cooperating with each shoe and allowing its shoe a predetermined brake-applying movement and thereafter being shifted by the shoe, and springs acting on opposite ends of the shoes for moving the shoes away from the drum and for shifting the stops back to their original positions when the brake is released.

8. A brake comprising, in combination, a drum, a pair of shoes engageable with the drum and the first of which applies the second when the drum is turning in one direction and the second of which applies the first when the drum is turning in the other direction, a stop device frictionally clamped to and carried by each of the shoes, spring means urging the shoes away from the drum to idle positions determined by the stop devices, and wear-adjusting means separate from said stop devices.

9. A brake comprising, in combination, a drum, a pair of shoes engageable with the drum and the first of which applies the second when the drum is turning in one direction and the second of which applies the first when the drum is turning in the other direction, a stop device frictionally clamped to and carried by each of the shoes, and springs arranged to move the shoes to positions determined by said devices when the brake is released before the brake is worn and which also operate to shift the stop devices to their original positions each time the brake is released after wear has taken place.

10. A brake shoe having a stiffening web, a stop device frictionally clamped to the stiffening web at one end and having an opening extending lengthwise of said web at the other end, in combination with a fixed stop member passing through said opening and being slightly smaller radially of the shoe than said opening, and a wear-compensating device at the end of the shoe.

11. A brake shoe having a stiffening web, a stop device frictionally clamped to the stiffening web at one end and having an opening extending lengthwise of said web at the other end, in combination with a fixed stop member passing through said opening and being slightly smaller radially of the shoe than said opening, said stop member being constructed and arranged to determine the position of the shoe in a direction at right angles to the stiffening web, together with a wear-compensating device at the end of the shoe.

12. A brake shoe having a stop device frictionally clamped thereto, in combination with means permitting a predetermined movement of the shoe without affecting the position of the stop device and arranged to shift the stop device angularly about one end after said predetermined movement, together with a wear-compensating device at the end of the shoe.

13. A brake shoe having a stiffening web formed with an opening, a stationary member having a shoulder on one side of the web and having a reduced portion beyond the shoulder projecting through the opening, washers on said member slidably engaging opposite sides of the stiffening web and one of which engages said shoulder, and means on the end of said reduced portion for preventing movement of the washers crosswise of the shoe.

14. A brake comprising, in combination, a drum, a pair of shoes arranged within the drum and the first of which applies the second when the drum is turning in one direction and the second of which applies the first when the drum is turning in the other direction, means connecting adjacent ends of the shoes at one side of the drum, anchoring means acting on the ends of the shoes at the opposite side of the drum and arranged to position said ends laterally, and steady rests engaging the connected ends of the shoes and positioning the connected ends laterally.

15. A brake comprising, in combination, a pair of shoes having adjustable abutments at their adjacent ends formed with partially spherical sockets facing toward each other and formed with non-circular heads, a spherical thrust device seated in said sockets, and a sleeve embracing said heads and which is operable to adjust them simultaneously with respect to the shoes.

In testimony whereof, I have hereunto signed my name.

LUDGER E. LA BRIE.